(12) United States Patent
Hsieh (10) Patent No.: US 8,599,465 B2
(45) Date of Patent: Dec. 3, 2013

(54) METHOD FOR MAKING AN ELECTROWETTING DEVICE

(75) Inventor: Incha Hsieh, Jhubei (TW)

(73) Assignee: Incha Hsieh, Singfong Township, Hsinchu County (TW)

( * ) Notice: Subject to any disclaimer, the term of this patent is extended or adjusted under 35 U.S.C. 154(b) by 229 days.

(21) Appl. No.: 12/889,140

(22) Filed: Sep. 23, 2010

(65) Prior Publication Data

US 2012/0073740 A1    Mar. 29, 2012

(51) Int. Cl.
| | |
|---|---|
| *G02F 1/035* | (2006.01) |
| *G02F 1/07* | (2006.01) |
| *B05D 3/06* | (2006.01) |
| *B05D 5/10* | (2006.01) |
| *B05D 5/12* | (2006.01) |
| *G09G 3/34* | (2006.01) |

(52) U.S. Cl.
USPC ........... 359/254; 359/246; 359/250; 359/253; 359/296; 427/108; 427/264; 427/265; 427/271; 345/107; 345/208; 345/697

(58) Field of Classification Search
USPC ............ 427/58, 105–110, 256–288; 349/445; 359/665–667, 296, 250–255; 345/107, 345/204–214, 690; 351/159.68
See application file for complete search history.

(56) References Cited

U.S. PATENT DOCUMENTS

| | | | |
|---|---|---|---|
| 6,099,746 A * | 8/2000 | Kim ................................. 216/25 |
| 7,508,566 B2 * | 3/2009 | Feenstra et al. ............... 359/228 |
| 7,787,190 B2 | 8/2010 | Mitsuda et al. |
| 7,821,699 B1 * | 10/2010 | Lo et al. ......................... 359/290 |
| 2008/0297030 A1 * | 12/2008 | Zhang et al. ................... 313/502 |
| 2009/0027751 A1 * | 1/2009 | Chen et al. ..................... 359/228 |
| 2009/0040591 A1 * | 2/2009 | Cheng et al. .................. 359/290 |
| 2009/0191334 A1 * | 7/2009 | Dai et al. ....................... 427/162 |
| 2010/0284056 A1 * | 11/2010 | Giraldo ......................... 359/292 |

FOREIGN PATENT DOCUMENTS

| | | |
|---|---|---|
| CN | 101493576 A | 7/2009 |
| CN | 101578545 A | 11/2009 |
| CN | 101666908 A | 3/2010 |
| CN | 101710210 A | 5/2010 |
| CN | 101738720 A | 6/2010 |

OTHER PUBLICATIONS

"Electrowetting Displays", Feenstra et al., Liquavista BV, http://www.liquavista.com/files/lqv0905291II5-15.pdf.*
Search Report dated Jan. 31, 2013, from Chinese Patent Application No. 2010102929724, 4 pages.

* cited by examiner

*Primary Examiner* — Michael Cleveland
*Assistant Examiner* — Eric Weedon
(74) *Attorney, Agent, or Firm* — Kilpatrick Townsend & Stockton LLP (57) ABSTRACT

A method for making an electrowetting device includes: (a) forming a surrounding wall on an upper surface of a substrate to surround a microchamber, the surrounding wall having an inner surface surrounding the microchamber and a top surface above the inner surface, the upper surface of the substrate being non-hydrophobic; (b) coating the surrounding wall and the upper surface of the substrate with a hydrophobic coating material; (c) removing a portion of the hydrophobic coating material formed on the top surface of the surrounding wall, thereby exposing the top surface of the surrounding wall; and (d) disposing a liquid into the microchamber.

4 Claims, 8 Drawing Sheets

METHOD FOR MAKING AN ELECTROWETTING DEVICE

BACKGROUND OF THE INVENTION

1. Field of the Invention

This invention relates to a method for making an electrowetting device, more particularly to a method for making an electrowetting device with a hydrophobic coating layer.

2. Description of the Related Art

An electrowetting device typically includes a liquid encapsulated therein which can change in surface electric properties when an external voltage is applied to the liquid to control operation modes of the liquid. The electrowetting device may be applied to a display, an optical liquid lens, a biochip, etc.

Figure 1:
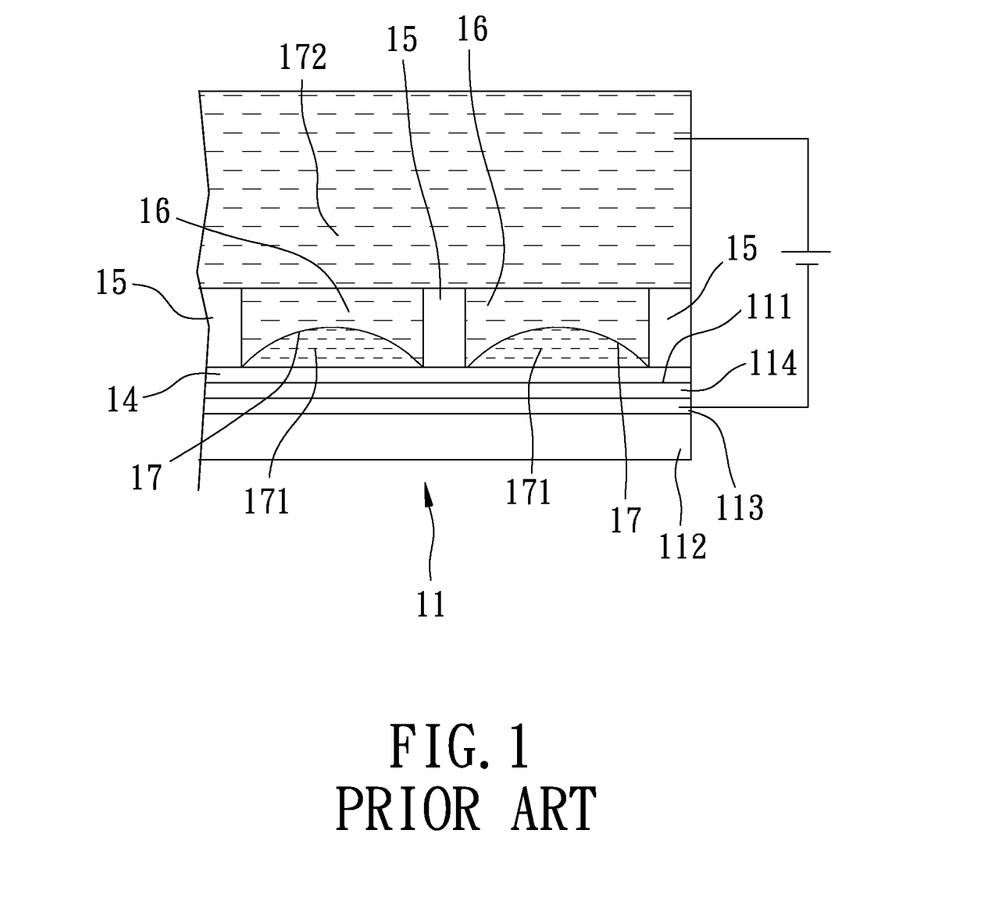
FIG. 1 is a schematic diagram of a conventional electrowetting device when no voltage is applied.

Referring to FIG. 1, a conventional electrowetting device comprises a substrate 11, a hydrophobic layer 14 formed on an upper surface 111 of the substrate 11, a surrounding wall 15 formed on the hydrophobic layer 14, a microchamber 16 surrounded by an inner surface of the surrounding wall 15 and formed over the hydrophobic layer 14, a top electrode 13 disposed above the surrounding wall 15, and a liquid 17 disposed in the microchamber 16 and on the hydrophobic layer 14 and disposed between the substrate 11 and the top electrode 13. The substrate 11 includes a base plate 112, a conductive layer 113, and an insulating layer 114. The liquid 17 includes first and second solutions 171, 172 that are immiscible with each other.

The top electrode 13 is an indium tin oxide (ITO) conductive glass.

By applying a voltage between the conductive layer 113 and the top electrode 13, the surface electric properties of the hydrophobic layer 14 and the liquid 17 are varied.

Figure 2:
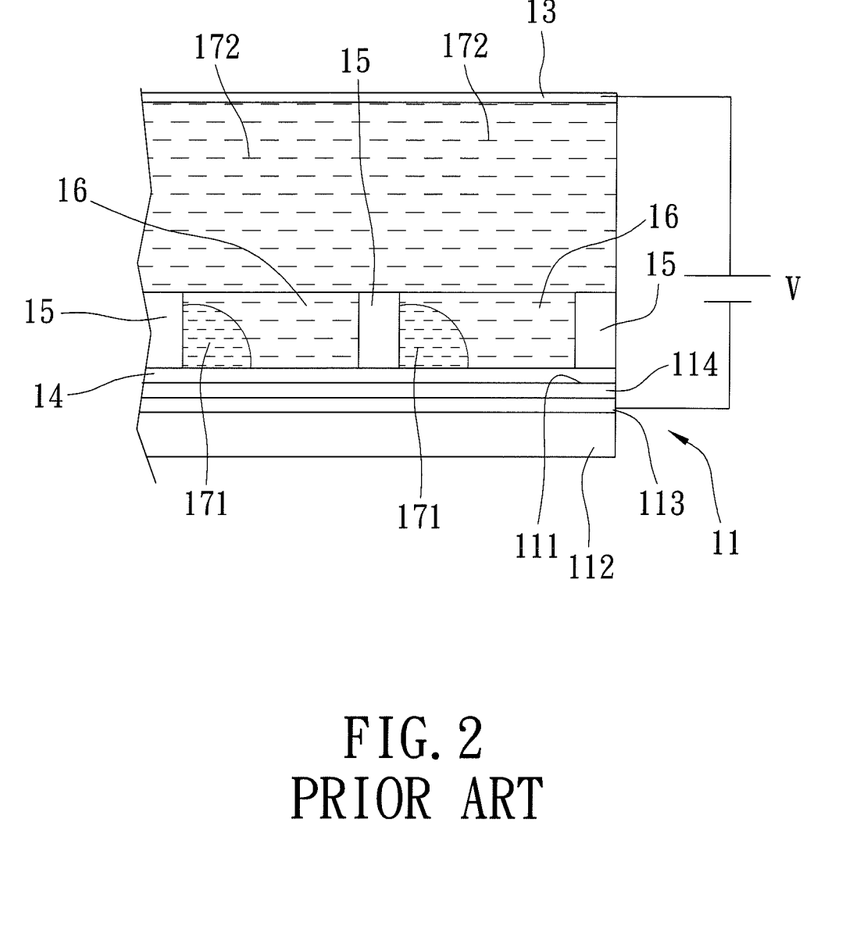
FIG. 2 is a schematic diagram of the electrowetting device of FIG. 1 when an external voltage is applied.

For example, if the electrowetting device is applied to a display, the first solution 171 may be a colored ink, and the second solution 172 may be water. When no external voltage is applied, the first solution 171 forms a rounded shaped liquid drop on the hydrophobic layer 14 as shown in FIG. 1. When an external voltage is applied, the surface electric properties of the first solution 171 and the hydrophobic layer 14 are varied (i.e., an interfacial tension between the first solution 171 and the hydrophobic layer 14 is varied). Accordingly, the first solution 171 moves aside, as shown in FIG. 2.

A method for producing the conventional electrowetting device comprises: (1) preparing the substrate 11; (2) forming the hydrophobic layer 14 on the upper surface 111 of the substrate 11; (3) forming the surrounding wall 15 on the hydrophobic layer 14 to define the microchamber 16; and (4) disposing the liquid 17 into the microchamber 16.

However, since the hydrophobic layer 14 is formed from a fluorine-containing polymer or a derivative thereof (for example, polytetrafluoroethylene, or a derivative of Polytetrafluoroethylene), and since the surface tension of the fluorine-containing polymer or the derivative is extremely small, an adhesion between the hydrophobic layer 14 and the surrounding wall 15 is relatively poor.

In order to improve the adhesion, before forming the surrounding wall 15, the upper surface of the hydrophobic layer 14 is modified by plasma treatment, irradiating with UV light, dipping in a chemical solvent, etc., to have a temporary or permanent modified surface. Accordingly, the surrounding wall 15 may be readily adhered to the modified surface of the hydrophobic layer 14.

However, surface modification of the hydrophobic layer 14 requires a relatively complicated process which increases the cost for producing the electrowetting device. Furthermore, the electrowetting device may encounter problems with respect to the reliability thereof due to the modified surface of the hydrophobic layer 14. On the other hand, when the electrowetting device is applied to a display, because the liquid drop of the first solution 171 is thick at its middle portion and thin at its lateral portion as shown in FIG. 1, leakage of light can occur at the lateral portion of the liquid drop, which is adverse to a contrast ratio of the electrowetting device in the display.

SUMMARY OF THE INVENTION

Therefore, an object of the present invention is to provide a method for making an electrowetting device that can overcome the aforesaid drawbacks associated with the prior art.

Accordingly, a method for making an electrowetting device of this invention comprises:

(a) forming a surrounding wall on an upper surface of a substrate to surround a microchamber, the surrounding wall having an inner surface surrounding the microchamber and a top surface above the inner surface, the upper surface of the substrate being non-hydrophobic;

(b) coating the surrounding wall and the upper surface of the substrate with a hydrophobic coating material;

(c) removing a portion of the hydrophobic coating material formed on the top surface of the surrounding wall, thereby exposing the top surface of the surrounding wall; and (d) disposing a liquid into the microchamber.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

According to the present invention, the preferred embodiments of an electrowetting device can be applied to a liquid lens, a display, etc.

Figure 3:
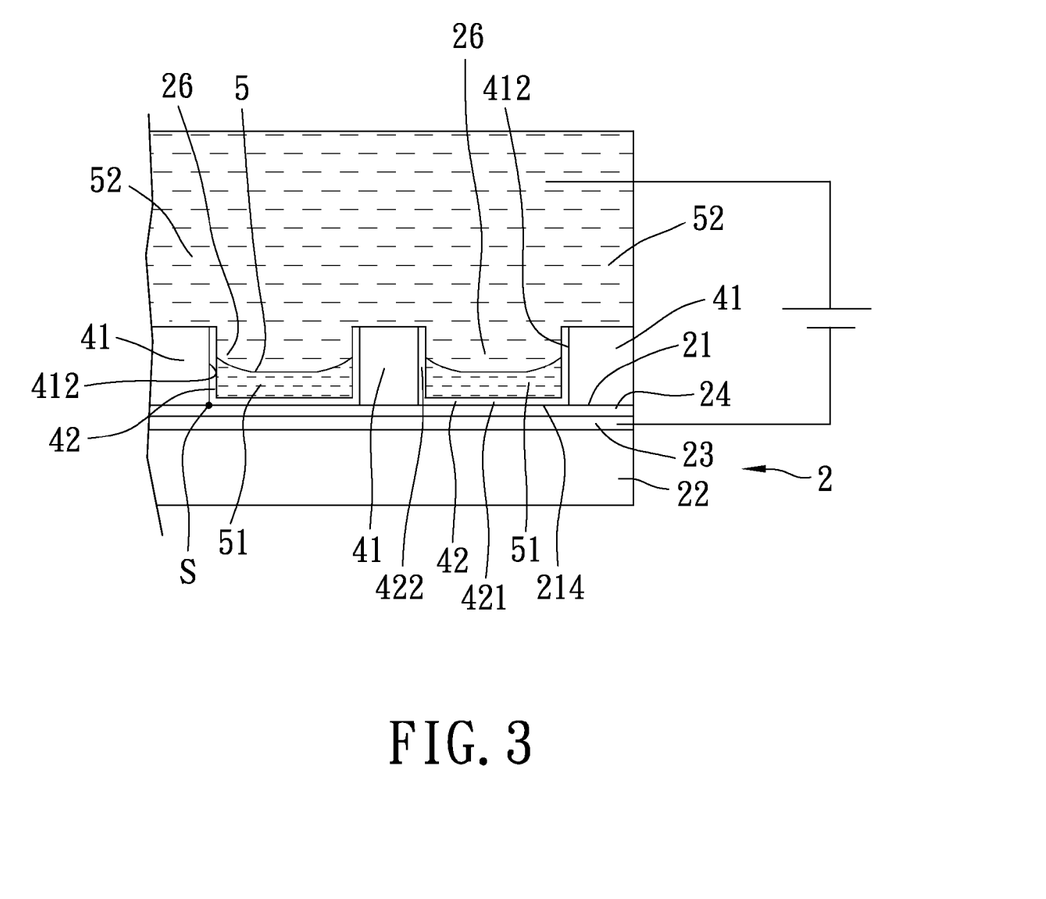
FIG. 3 is a schematic diagram for illustrating the first preferred embodiment of an electrowetting device according to the present invention, wherein no voltage is applied.

FIG. 3 shows the first preferred embodiment of the electrowetting device when no voltage is applied. The electrowetting device comprises a substrate 2, a surrounding wall 41, a microchamber 26, a hydrophobic coating layer 42, a top electrode 3, and a liquid 5.

The substrate 2 includes a non-hydrophobic insulating layer 24, a conductive layer 23 beneath the insulating layer 24, and a transparent base plate 22 beneath the conductive layer 23. The conductive layer 23 is used as an electrode. The materials of the base plate 22, the conductive layer 23 and the insulating layer 24 are well-known in the art, and the details of the same are omitted hereinafter. In the first preferred embodiment, the base plate 22 is made of glass, the conductive layer 23 is made of indium tin oxide (ITO) and may have a thickness ranging from 600 Å to 1000 Å, and the insulating layer 24 is made of silicon nitride and has a thickness of 2000 Å.

The surrounding wall 41 is formed on an upper surface 21 of the insulating layer 24, and is made of a photosensitive material or a non-photosensitive material. Examples of the photosensitive material include a positive type photoresist material, and a negative type photoresist material (such as a common photoresist, black resin matrix, or a thick-film photoresist, etc.). Examples of the non-photosensitive material include a metallic material, an acrylic-based polymeric material, and a polyimide-based material. In the preferred embodiment, the surrounding wall 41 is made of the negative type photoresist material.

The microchamber 26 is surrounded by an inner surface 412 of the surrounding wall 41 and is formed over the upper surface 21 of the insulating layer 24.

The hydrophobic coating layer 42 is applied to the inner surface 412 of the surrounding wall 41 and the upper surface 21 of the insulating layer 24, and covers a seam (S) between the inner surface 412 and the upper surface 21. The hydrophobic coating layer 42 may be formed from a fluorine-containing polymer or a derivative thereof. In the first preferred embodiment, the hydrophobic coating layer 42 is made of Polytetrafluoroethylene.

The liquid 5 is disposed in the microchamber 26 and on the hydrophobic coating layer 42, and includes first and second solutions 51, 52. In the first preferred embodiment, the first solution 51 is a colored ink and the second solution 52 is electroconductive solution.

The top electrode 3 is an indium tin oxide (ITO) conductive glass and is in contact with the second solution 52. Of course, the top electrode 3 may be replaced by a lamination of a substrate and an electrode layer, the electrode layer being in contact with the second solution 52.

When no voltage is applied, the first solution 51 covers an entire bottom region 421 of the hydrophobic coating layer 42, and the second solution 52 lies over the first solution 51. When an external voltage is applied between the conductive layer 23 and the top electrode 3, the surface electric properties of the liquid 5 and the hydrophobic coating layer 42 are varied and an interfacial tension between the liquid 5 and the hydrophobic coating layer 42 is changed. Accordingly, the first solution 51 moves aside (not shown in the drawings). In actual practices, the first solution 51 may move toward one side of the surrounding wall 41, or is dispersed to all sides of the inner surfaces of the surrounding wall 41.

On the other hand, because the hydrophobic coating layer 42 covers both of the inner surface 412 of the surrounding wall 41 and the upper surface 21 of the insulating layer 24, the first solution 51 has an increased thickness at its lateral end portion when no voltage is applied. Therefore, the problem of light leakage and insufficient contrast ratio occurring in the prior art may be alleviated in the first preferred embodiment of the electrowetting device of this invention.

Figure 4:
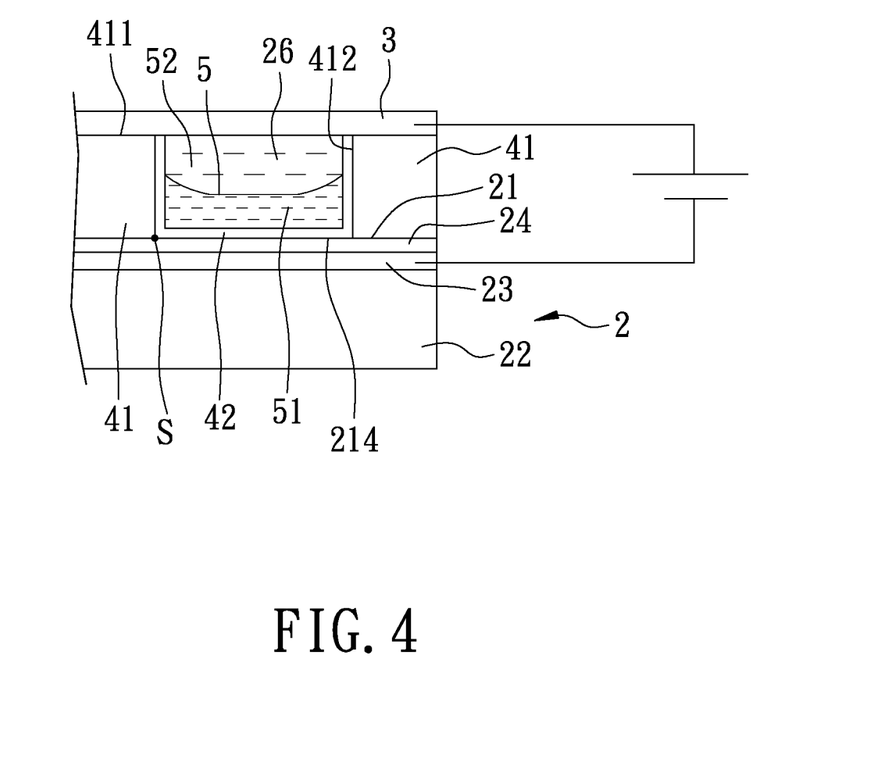
FIG. 4 is a schematic diagram of the electrowetting device, in which a top electrode is disposed on a surrounding wall to enclose a liquid in a microchamber.

In other preferred embodiments, the top electrode 3 is disposed on a top surface 411 of the surrounding wall 41 (see FIG. 4) to enclose the liquid 5 in the microchamber 26.

Figure 5:
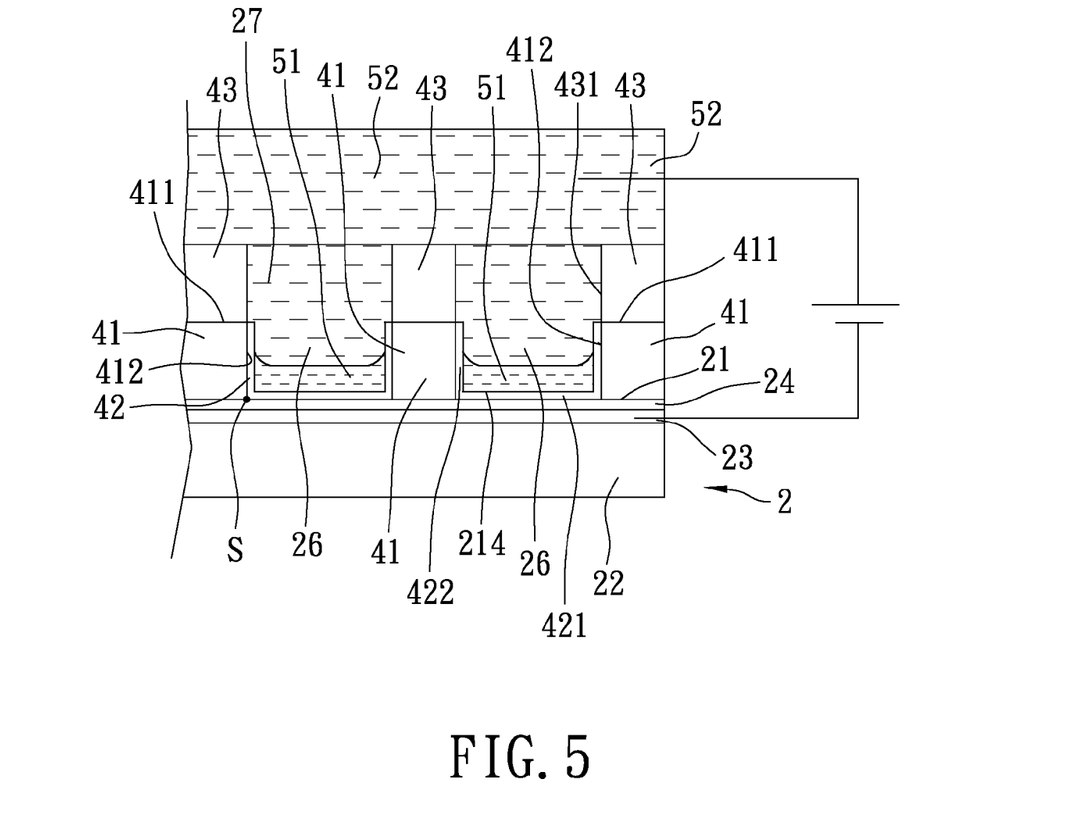
FIG. 5 is a schematic diagram of the electrowetting device of FIG. 3 which is modified with an extension wall, wherein no voltage is applied.

Referring to FIG. 5, according to the first preferred embodiment of the present invention, the electrowetting device may further comprise an extension wall 43 to enlarge the microchamber 26. The extension wall 43 extends upwardly from the top surface 411 of the surrounding wall 41 and has an inner surface 431 that surrounds the microchamber 26 and that is free of the hydrophobic coating layer 42. By the provision of the extension wall 43, the first solution 51 can be prevented from flowing over the surrounding wall 41 and from flowing between two adjacent microchambers 26. As shown in FIG. 5, the extension wall 43 has the same thickness as the surrounding wall 41.

Figure 6:
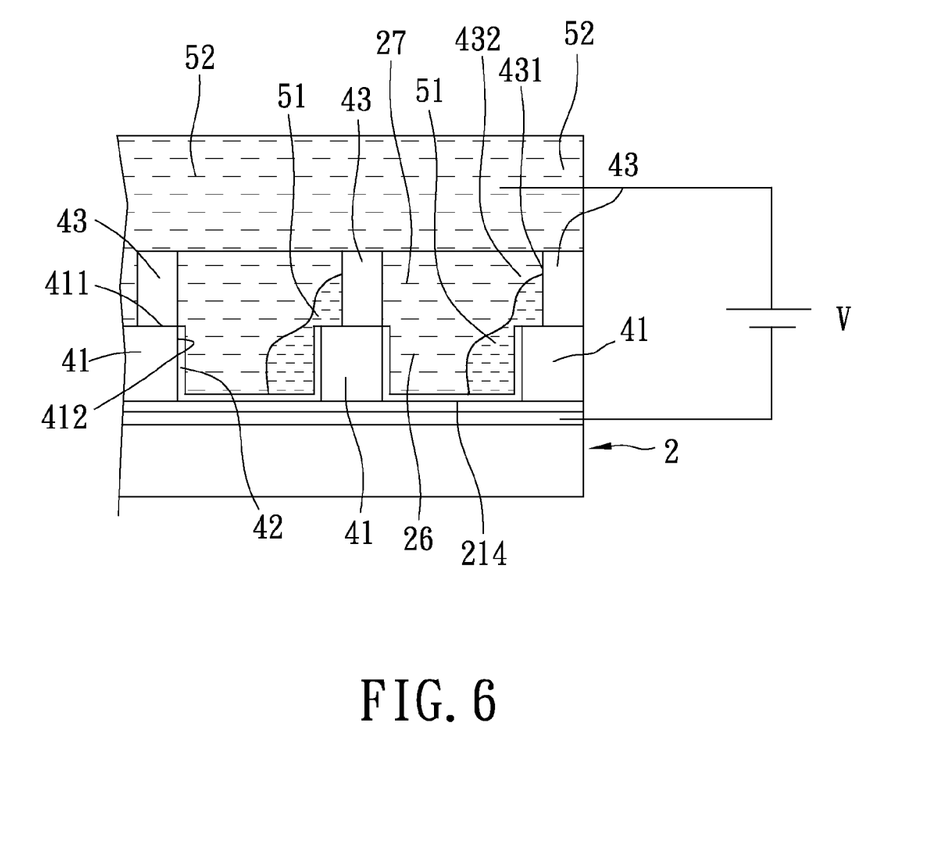
FIG. 6 is a schematic diagram of the electrowetting device, in which the extension wall has a reduced thickness.

Of course, the extension wall 43 may have a thickness larger or smaller than that of the surrounding wall 41. Referring to FIG. 6, the extension wall 43 has a thickness smaller than that of the surrounding wall 41. Thus, when the first solution 51 moves aside, a portion of the first solution 51 may move to an extended space 432 created by the reduced thickness of the extension wall 43 relative to the surrounding wall 41 (see FIG. 6). Accordingly, the electrowetting device of FIG. 6 may have a relatively high aperture ratio and hence a relatively high contrast ratio.

A method for producing the electrowetting device according to the first preferred embodiment of this invention includes: (a) forming the surrounding wall 41, (b) coating a hydrophobic coating material, and (c) disposing the liquid 5.

In the step (a), the surrounding wall 41 is formed on the upper surface 21 of the insulating layer 24 of the substrate 2 to define the microchamber 26 by coating a layer of the negative type photoresist material (e.g., acrylic-based photoresist of JSR Co, model: THB-120N), followed by exposing and developing the same. The step for forming the surrounding wall 41 is well-known in the art, and thus, the details of the same are omitted hereinafter.

In the step (b), the inner surface 412 of the surrounding wall 41 and the upper surface 21 of the insulating layer 24 are coated with a hydrophobic coating material. In this preferred embodiment, the hydrophobic coating material is Polytetrafluoroethylene.

Preferably, the hydrophobic coating material is applied to the surrounding wall 41 and the substrate 2 by spin coating, dip coating, spray coating or curtain coating, followed by removing a portion of the hydrophobic coating material formed on the top surface 411 of the surrounding wall 41, thereby exposing the top surface 411 of the surrounding wall 41.

Preferably, the portion of hydrophobic coating material may be removed by mechanical polishing, chemical mechanical polishing, laser, or etching. In this preferred embodiment, the portion of hydrophobic coating material is removed by mechanical polishing. Accordingly, the hydrophobic coating layer 42 is not only formed on the inner surface 412 of the surrounding wall 41 but also covers the seam (S) (see FIG. 3) between the inner surface 412 and the upper surface 21.

In the step (c), the liquid 5 including the first and second solutions 51, 52 is disposed into the microchamber 26.

Preferably, the method for producing the electrowetting device according to the first preferred embodiment of this invention may further include a step (d) of forming the extension wall 43.

In the step (d), the extension wall 43 is formed on the top surface 411 of the surrounding wall 41 that has been exposed in such a manner that the extension wall 43 surrounds the microchamber 26. The extension wall 43 is free of the hydrophobic coating material. The material of the extension wall 43 and the procedures for forming the extension wall 43 are similar to those of the surrounding wall 41. In the preferred embodiment, the extension wall 43 is formed by coating a layer of a positive type photoresist material on the surrounding wall 41, followed by exposing and developing the photoresist material through a self-aligning process using the surrounding wall 41, so that the extension wall 43 is formed on the surrounding wall 41 (see FIG. 5).

Figure 7:
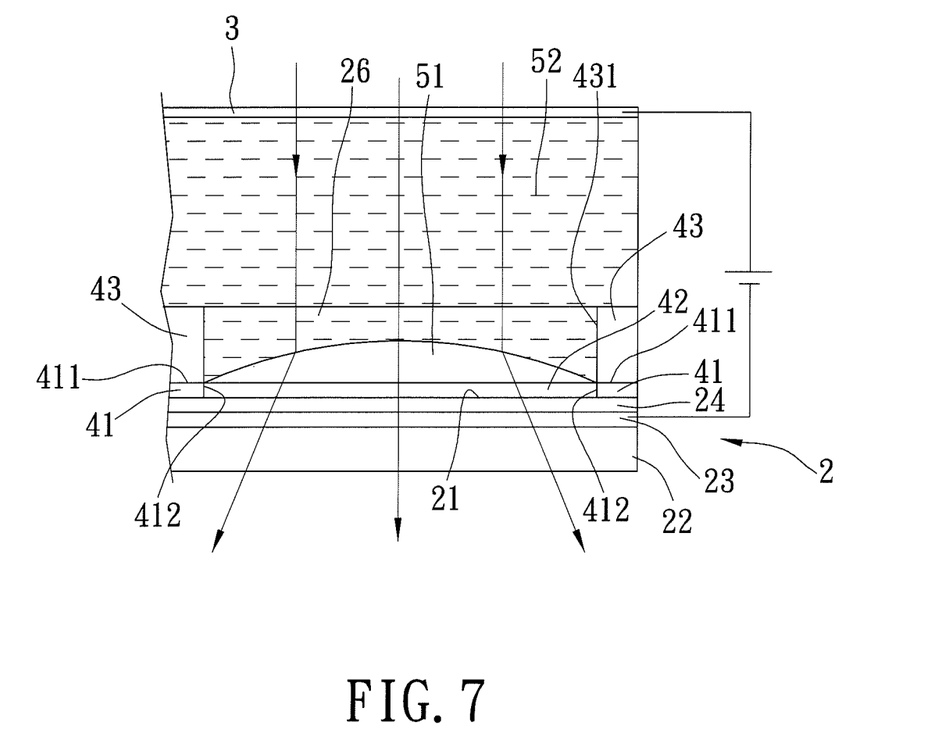
FIG. 7 is a schematic diagram for illustrating the second preferred embodiment of an electrowetting device according to the present invention, wherein no voltage is applied.
Figure 8:
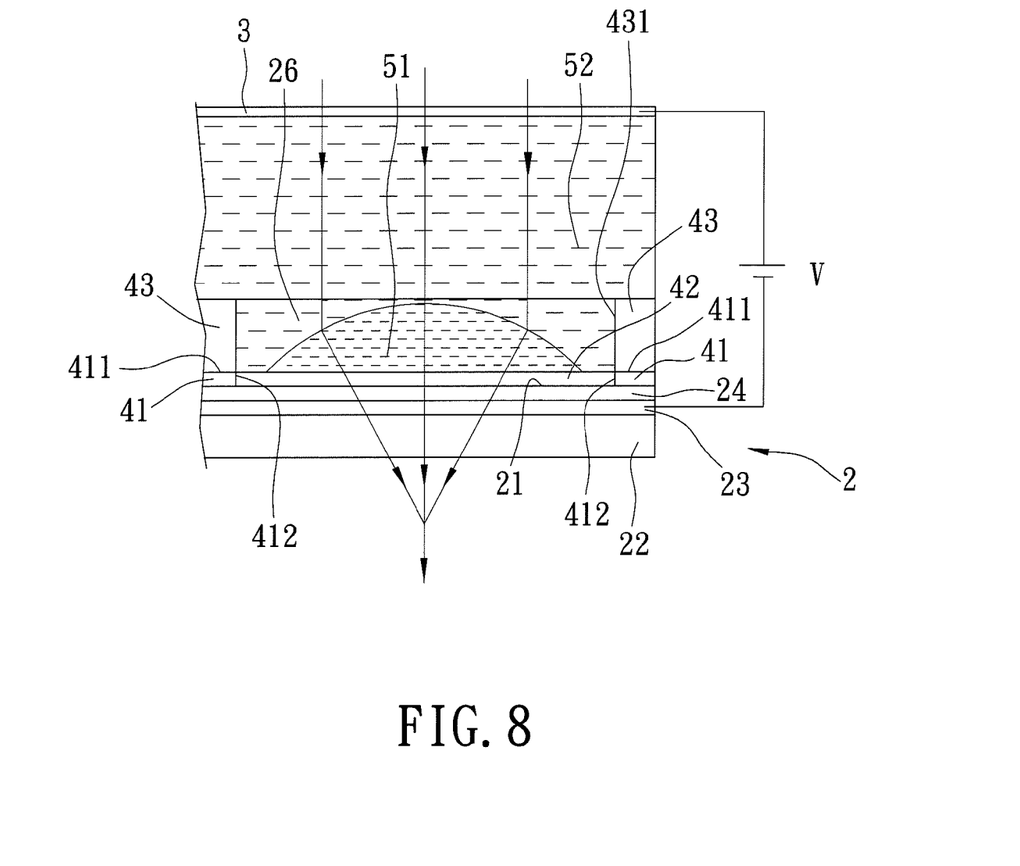
FIG. 8 is a schematic diagram of the electrowetting device of FIG. 7 when an external voltage is applied.

FIGS. 7 and 8 illustrate an electrowetting device according to the second preferred embodiment of the present invention, which is generally similar to the first preferred embodiment. However, the second preferred embodiment is applied to a liquid lens. The hydrophobic coating layer 42 completely fills a portion of the microchamber 26 that is surrounded by an entire part of the surrounding wall 41 so that the surface of the hydrophobic coating layer 42 is flush with the upper surface 21 of the insulating layer 24. Accordingly, the hydrophobic coating layer 42 covers the upper surface 21 of the insulating layer 24 and the inner surface 412 of the surrounding wall 41. The first solution 51 is an insulating solution. The second solution 52 is a conductive solution and is immiscible with the first solution 51. The shape of the first solution 51 can be changed when a voltage is applied between the conductive layer 23 and the second solution 52.

In summary, since the hydrophobic coating layer 42 is formed after the surrounding wall 41 is formed on the insulating layer 24 of the substrate 2, the adhesion of the surrounding wall 41 can be improved without plasma modifying the upper surface 21 of the insulating layer 24. Because the hydrophobic coating layer 42 covers the seam (S) (see FIG. 3) of the insulating layer 24 and the surrounding wall 41, an improved fluid-tight effect can be achieved. On the other hand, by the provision of the extension wall 43, the first solution 51 can be prevented from flowing over the surrounding wall 41, and the microchamber 26 can be provided with an increased receiving space. Furthermore, by allowing a portion of the first solution 51 to move to the extended space 432 created by the thickness difference of the extension wall 43 and the surrounding wall 41 when the external voltage is applied (see FIG. 6), a light incident area for an incident light to enter the microchamber 26 can be increased, thereby improving the contrast ratio of the electrowetting device.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A method for making an electrowetting device, comprising:

provided a substrate including a conductive layer and an insulating layer disposed on the conductive layer;

forming a light-impermeable layer on the insulating layer;

patterning the light-impermeable layer to form a surrounding wall and a primary microchamber which is defined by an inner peripheral surface of the surrounding wall and which extends from a top surface of the light-impermeable layer to terminate at and expose an upper surface region of the insulating layer;

applying a hydrophobic coating material to the upper surface region of the insulating layer to form a bottom region, to the inner peripheral surface of the surrounding wall to form a surrounding region, and to the top surface of the light-impermeable layer;

removing the hydrophobic coating material applied to the top surface of the light-impermeable layer, while leaving the bottom region and the surrounding region intact, thereby providing the primary microchamber with a hydrophobic coating layer; and filling the primary microchamber with a liquid which includes a first solution and a second solution that is immiscible with the first solution, such that once a voltage is applied between the second solution and the conductive layer, the liquid transforms from a first state, in which the first solution lies below the second solution so as to permit the first solution to fully cover the bottom region, to a second state in which the first solution partially covers the bottom region of the hydrophobic coating layer so as to permit the second solution to come into contact with the bottom region.

2. The method of claim 1, wherein in the first state, the first solution has a concave surface adhered to the surrounding region of the hydrophobic coating layer so as to prevent downward penetration of the second solution through the first solution along the surrounding region of the hydrophobic coating layer.

3. The method of claim 1, further comprising:

after removing the hydrophobic coating material and before filling the primary microchamber with a liquid, forming an extension layer on a decoated top surface of the light-impermeable layer; and patterning the extension layer to form an extension wall and a secondary microchamber which is defined by an inner peripheral surface of the extension wall and which is in spatial communication with the primary microchamber.

4. The method of claim 3, wherein the secondary microchamber has a dimension larger than that of the primary microchamber such that when the liquid is in the second state, the first solution in the primary microchamber has a reduction in volume so as to permit the second solution to come into contact with a larger area of the bottom region.

* * * * *